United States Patent
Fukumoto et al.

[11] Patent Number: 6,112,787
[45] Date of Patent: Sep. 5, 2000

[54] HEAVY DUTY PNEUMATIC TIRE INCLUDING NARROW RIB

[75] Inventors: Tetsuhiro Fukumoto; Yukihide Ouya; Kiyoshi Ueyoko, all of Kobe, Japan

[73] Assignee: Sumito Rubber Industries, Ltd., Hyogo-ken, Japan

[21] Appl. No.: 08/887,224

[22] Filed: Jul. 2, 1997

[30] Foreign Application Priority Data

Jul. 4, 1996 [JP] Japan ..................... 8-174673

[51] Int. Cl.[7] .............. B60C 11/04; B60C 11/12; B60C 11/13; B60C 105/00
[52] U.S. Cl. .............. 152/209.15; 152/209.27; 152/DIG. 3
[58] Field of Search .......... 152/209 R, 209 D, 152/209.15, 209.18, 209.24, 209.27, DIG. 3

[56] References Cited

U.S. PATENT DOCUMENTS

| | | | |
|---|---|---|---|
| 3,707,177 | 12/1972 | Boileau | 152/209 R |
| 4,550,756 | 11/1985 | Hinkel . | |
| 5,131,444 | 6/1992 | Kukimoto et al. | 152/209 R |
| 5,323,825 | 6/1994 | Yamagishi et al. | 152/209 R |
| 5,345,988 | 9/1994 | Kabe et al. | 152/209 R |
| 5,456,301 | 10/1995 | Wise | 152/209 R |
| 5,833,780 | 11/1998 | Kishi et al. | 152/209 R |

FOREIGN PATENT DOCUMENTS

| | | | |
|---|---|---|---|
| 0313361A | 5/1989 | European Pat. Off. . | |
| 659594 | 6/1995 | European Pat. Off. | 152/209 R |
| 2-114005 | 4/1990 | Japan . | |
| 3-136906 | 6/1991 | Japan | 152/209 R |
| 4-43103 | 2/1992 | Japan | 152/209 R |
| 5-246213 | 9/1993 | Japan | 152/209 R |
| 6-239109 | 8/1994 | Japan | 152/209 R |
| 8-183309 | 7/1996 | Japan . | |
| 1549347 | 8/1979 | United Kingdom | 152/209 R |

*Primary Examiner*—Steven D. Maki

[57] ABSTRACT

A heavy duty pneumatic tire having improved resistance to uneven tread wear includes a tread portion provided with an axially outer longitudinal main groove and an axially inner longitudinal narrow groove, each extending circumferentially about the tire to define a narrow rib therebetween, the axially inner edge of the narrow rib being chamfered by a slope. In the tire meridian section, the slope is straight or concave. The axial width of the axially inner longitudinal narrow groove is in the range of from 0.5 to 2.5 mm. The axial width (W3) of the slope measured between the upper and lower edges thereof is in the range of from 0.3 to 0.8 times the axial width (W2) of the narrow rib, and the radial height (H2) of the slope measured between the upper and lower edges is in the range of from 0.3 to 0.8 times the depth (H1) of the axially inner longitudinal narrow groove.

17 Claims, 10 Drawing Sheets

HEAVY DUTY PNEUMATIC TIRE INCLUDING NARROW RIB

FIELD OF THE INVENTION

The present invention relates to a heavy duty pneumatic tire for truck, bus and the like, which is improved resistance to uneven tread wear.

DESCRIPTION OF THE RELATED ART

In heavy duty tires for trucks, buses and the like, rib type tread patterns are usually used for their resistance to wear.

With such a rib pattern, however, shoulder wear (where shoulder ribs wear earlier than axially inner ribs) is liable to occur, and the shoulder wear spreads axially inward to cause uneven tread wear.

In order to prevent the uneven wear, the laid-open Japanese patent application No. JP-A-5-246213 discloses a pneumatic tire, wherein, as shown in FIG. 10(A), a narrow width longitudinal groove (g) is disposed in the axially outer edge portion of a rib (f), adjacent to the shoulder rib (a). The narrow groove (g) extends continuously in the circumferential direction of the tire, in order to stop the axially inward spread of wear at the subdivided narrow rib (i), (that is, to concentrate the wear on the narrow rib (i)), and thereby prevent the main portion (h) of the rib from being worn unevenly.

However, in this arrangement, when the narrow rib (i) is subjected to a side force during cornering, the narrow rib (i) contacts the main portion (h) as shown in FIG. 10(B), and the narrow rib (i) and the main portion (h) are liable to move together, thus effectively function as one body. Therefore, contrary to the intention, it is difficult to fully control uneven wear.

SUMMARY OF THE INVENTION

It is therefore, an object of the present invention to provide a heavy duty pneumatic tire in which uneven wear is fully prevented in order to improve tire durability by effectively concentrating wear on a narrow rib.

According to one aspect of the present invention, a heavy duty pneumatic tire comprises a tread portion provided with an axially outer longitudinal main groove and an axially inner longitudinal narrow groove, each extending circumferentially about the tire to define a narrow rib therebetween. The axially inner edge of the narrow rib is chamfered by a slope extending from the top surface to the axially inner surface of the narrow rib defining the upper and lower edges of the slope. Preferably, the axial width of the narrow groove is in the range of from 0.5 to 2.5 mm. The axial width of the slope measured between the upper and lower edges is in the range of from 0.3 to 0.8 times the axial width of the narrow rib. The radial height of the slope measured between the upper and lower edges is in the range of from 0.3 to 0.8 times the depth of the narrow groove.

Therefore, if the narrow rib is subjected to a strong side force during cornering, the top of the narrow rib does not contact the axially inwardly adjacent rib. Thus, the wear is concentrated on the narrow rib, and the axially inward spread of wear is stopped at the narrow rib, thereby preventing uneven tread wear.

BRIEF DESCRIPTION OF THE DRAWINGS

Embodiments of the present invention will now be described in detail in conjunction with the accompanying drawings.

DETAILED DESCRIPTION OF THE INVENTION

Figure 1:
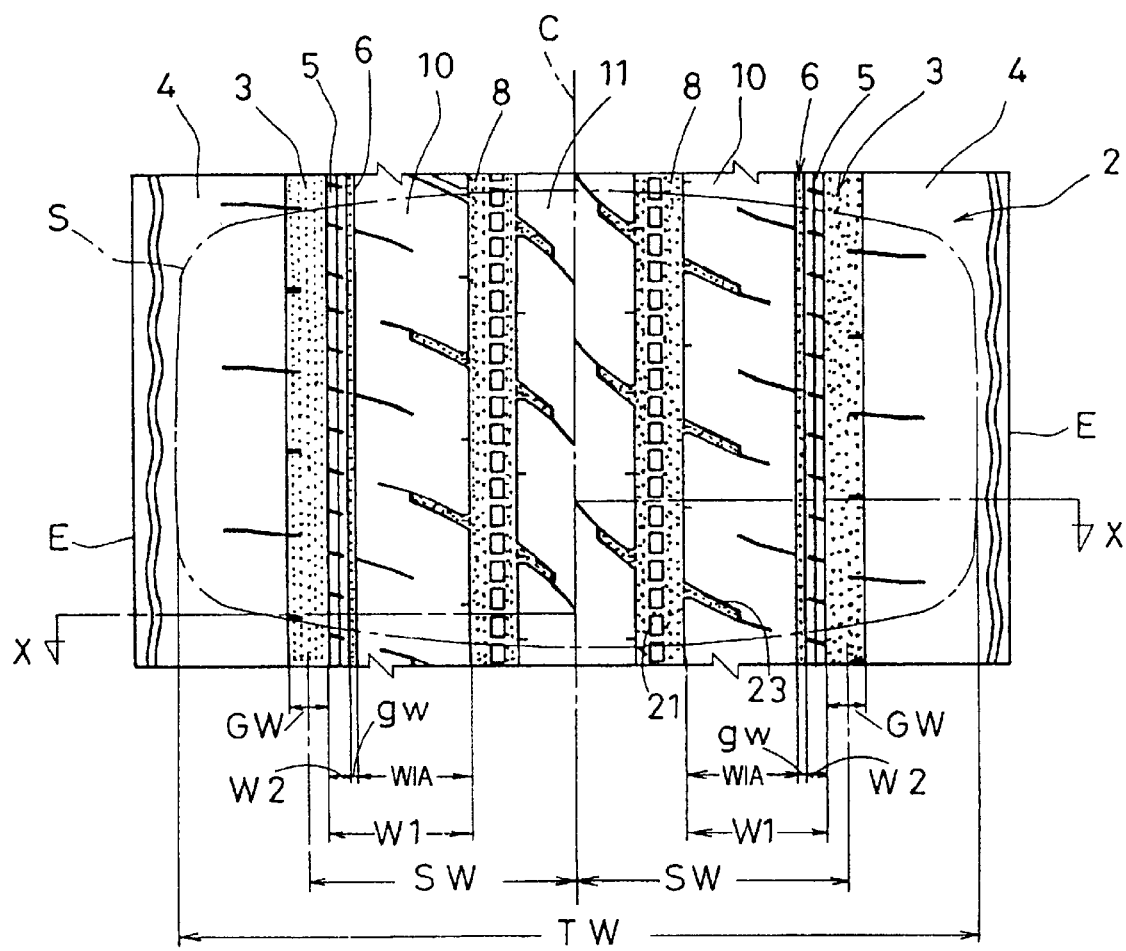
FIG. 1 is a developed plan view of an embodiment of the present invention showing an example of the tread pattern.

In the figures, the heavy duty pneumatic tire 1 according to the present invention comprises a tread portion 12, a pair of axially spaced bead portions 14 with a bead core 15 therein, a pair of sidewall portions 13 extending between the tread edges E and the bead portions 14, a carcass 16 extending between the bead portions 14, a belt 17 disposed radially outside the carcass 16 and inside a rubber tread, The tire 1 in this embodiment is a radial tire for trucks and buses. The tire size is for example 285/75R24.5. The tire has a squared shoulder as in termed in the art.

The carcass 16 is composed of at least one ply of cords arranged radially at an angle of 90 to 70 degrees with respect to the tire equator C and extends between the bead portions 14 through the tread portion 12 and the sidewall portions 13 and is turned up around the bead cores 15 in the bead portions 14 to have a radial or semiradial structure.

For the carcass cords, organic fiber cords, e.g. polyester, nylon, rayon, aromatic polyamide and the like and steel cords can be used.

Figure 2:
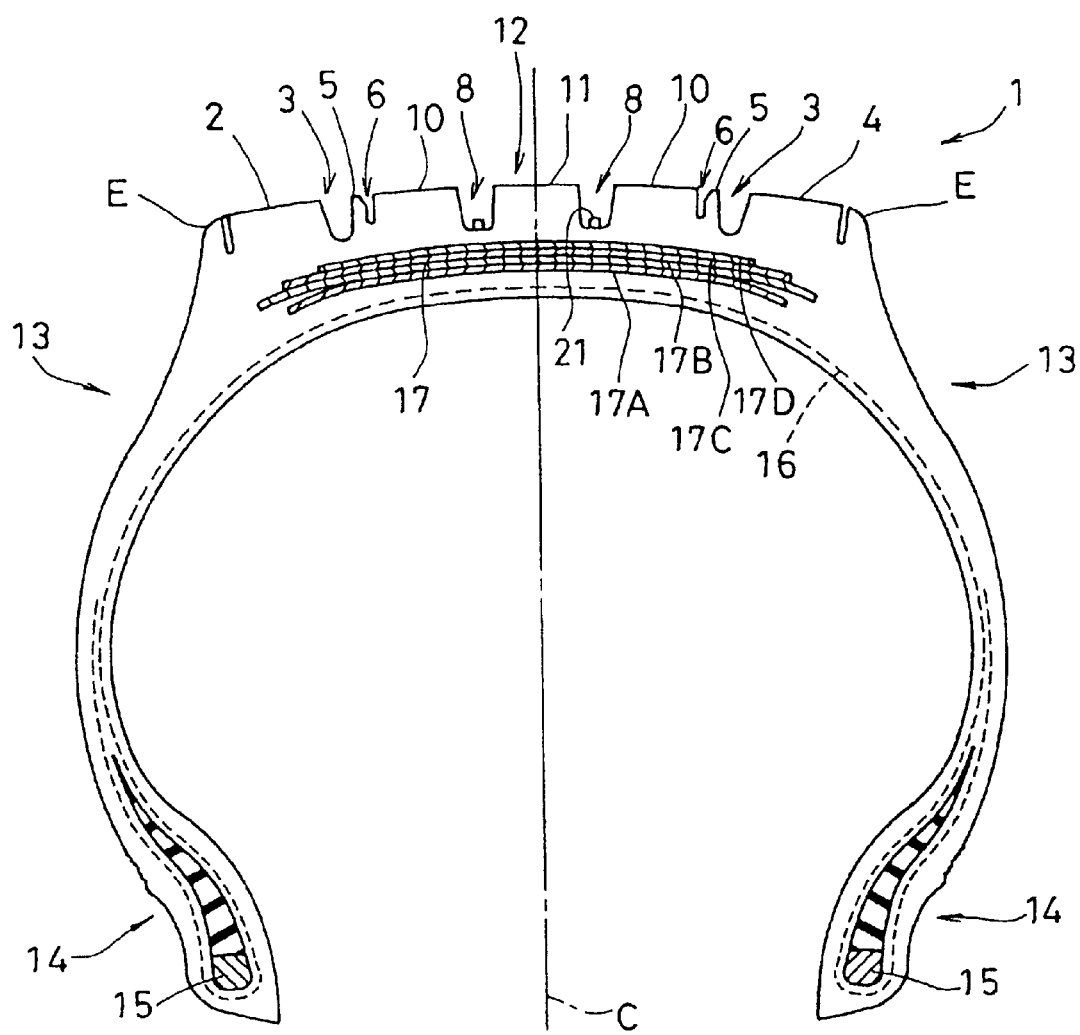
FIG. 2 is a cross sectional view of the tire taken along a line X—X of FIG. 1.

The belt 17 is composed of two to four plies of parallel cords (four plies 17A, 17B, 17C and 17D are shown in the example of FIG. 2 are) inclined at a certain angle with respect to the tire equator C, and at least two plies (17B and 17C) are oriented so as to cross each other.

For the belt cords, organic fiber cords, e.g. nylon, aromatic polyamide, rayon, polyester and the like and steel cords can be used.

FIG. 1 shows an example of the tread pattern. The tread portion 12 is provided on each side of the tire equator C with an axially outer longitudinal main groove 3, an axially inner longitudinal main groove 8, and a longitudinal narrow groove 6 disposed between the wide longitudinal grooves 3 and 8. Each of the longitudinal grooves 3, 8 and 6 extends continuously in the circumferential direction of the tire.

Accordingly, the tread 2 is provided on each side of the tire equator C with a shoulder rib 4 between the axially outer longitudinal main groove 3 and the adjacent tread edge E, a narrow rib 5 between the axially outer longitudinal main groove 3 and the longitudinal narrow groove 6, an axially inner rib 10 between the longitudinal narrow groove 6 and the inner longitudinal main groove 8, and a central rib 11 between the two inner longitudinal main grooves 8.

The axial distance SW from the center of axially outer longitudinal main groove 3 to the tire equator C is preferably set in the range of from 22.5 to 37.5% of the ground contacting width TW.

If the distance SW is more than 37.5% of the ground contacting width TW, the rigidity of the shoulder ribs 4 decreases causing the handling performance to deteriorate, and further the ground pressure becomes uneven and uneven wear is liable to occur.

If the distance SW is less than 22.5%, the inner rib 10 makes the ground contact substantially evenly and thus it is hard for uneven wear to occur, so there is no need to prevent it. Here, the ground contacting width TW is the axial width of the ground contacting area S under standard conditions in which the tire is mounted on a standard rim and inflated to a standard pressure and then loaded with a standard load. The standard rim is the standard rim specified in JATMA, the "Measuring Rim" in ETRTO, the "Design Rim" in TRA or the like. The standard pressure is the maximum air pressure in JATMA, the "Inflation Pressure" in ETRTO, the maximum pressure given in the "Tire Load Limits at Various Cold Inflation Pressures" table in TRA or the like. The standard load is the maximum load capacity in JATMA, the "Load Capacity" in ETRTO, the maximum value given in the above-mentioned table in TRA or the like.

The groove-top width GW of the axially outer longitudinal main groove 3 is preferably in the range of from 4 to 12% of the ground contacting width TW.

The groove depth GH of the axially outer longitudinal main groove 3 is in the range of from 5 to 18% of the ground contacting width TW.

(For example, TW=190 mm, GW=10 mm, GH=14.6 mm)

The inner longitudinal main groove 8 is made wider than the axially outer longitudinal main groove 3 to increase the drainage.

In the groove 8, projections 21 standing out from the groove bottom by a small height are disposed in a circumferential row to prevent stone trapping.

The axially outer longitudinal main groove 3 and the inner longitudinal main groove 8 are both straight in this example, but a zigzag groove may be used.

The longitudinal narrow groove 6 has a groove width gw in the range of from 0.5 to 2.5 mm, and a groove depth H1 in the range of from 50 to 100% of the groove depth GH of the axially outer longitudinal main groove 3.

(For example, gw=2 mm, H1=10 mm)

The longitudinal narrow groove 6 extends circumferentially substantially in parallel to the axially outer longitudinal main groove 3, and the above-mentioned narrow rib 5 is defined between the longitudinal narrow groove 6 and the axially outer longitudinal main groove 3.

If the groove width gw is less than 0.5 mm, it becomes too hard to make the tire vulcanizing mold.

If the groove width gw is more than 2.5 mm, the axial deformation of the narrow rib 5 increases and the rubber is liable to be torn off. Further, it becomes hard to concentrate the wear energy on the top of the narrow rib 5.

If the groove depth H1 is less than 50% of the groove depth GH, the rigidity of the narrow rib 5 increases excessively and the difference in rigidity relative to the inner rib 10 decreases. As a result, it becomes difficult to concentrate the wear on the narrow rib 5.

If the groove depth H1 is more than 100%, the thickness of the tread rubber becomes excessive, so the heat generated during running increased and tire weight both increase.

More preferably, the groove depth H1 is set in the range of from 50 to 80% of the groove depth GH, whereby the narrow rib rubber can be effectively prevented from being torn off.

The provision of the narrow rib 5 is for concentrating wear thereon. For this purpose, the axial width W2 of the narrow rib 5 is preferably in the range of from 3.0 to 7.0 mm and/or in the range of from 0.1 to 0.2 times the axial distance W1 between the axially inner edge of the axially outer longitudinal main groove 3 and the axially outer edge of the axially inner longitudinal main groove 8.

If the width W2 is less than 0.1 times the axial distance W1 and less than 3.0 mm wide, the rigidity of narrow rib decreases escessively and the narrow rib 5 can easily move rather than resist movement. Therefore, wear is caused on other ribs instead of on narrow rib 5.

If the width W2 is more than 0.2 times the axial distance W1 and more the 7.0 mm wide, rib rigidity increases excessively. Therefore, it is difficult to concentrate tread wear on the narrow rib 5.

More preferably, the narrow rib width W2 is in the range of from 4.0 to 6.0 mm.

The axially inside corner of the narrow rib 5 is chamfered by a slope 7S along the entire length of the narrow rib 5.

In a cross section including the tire axis, the slope 7S is not convex between the upper edge Pu and lower edge Pd thereof. That is, the slope 7S is a straight line L or a concave line running on the opposite side of the straight line L to the longitudinal narrow groove 6.

Figure 3:
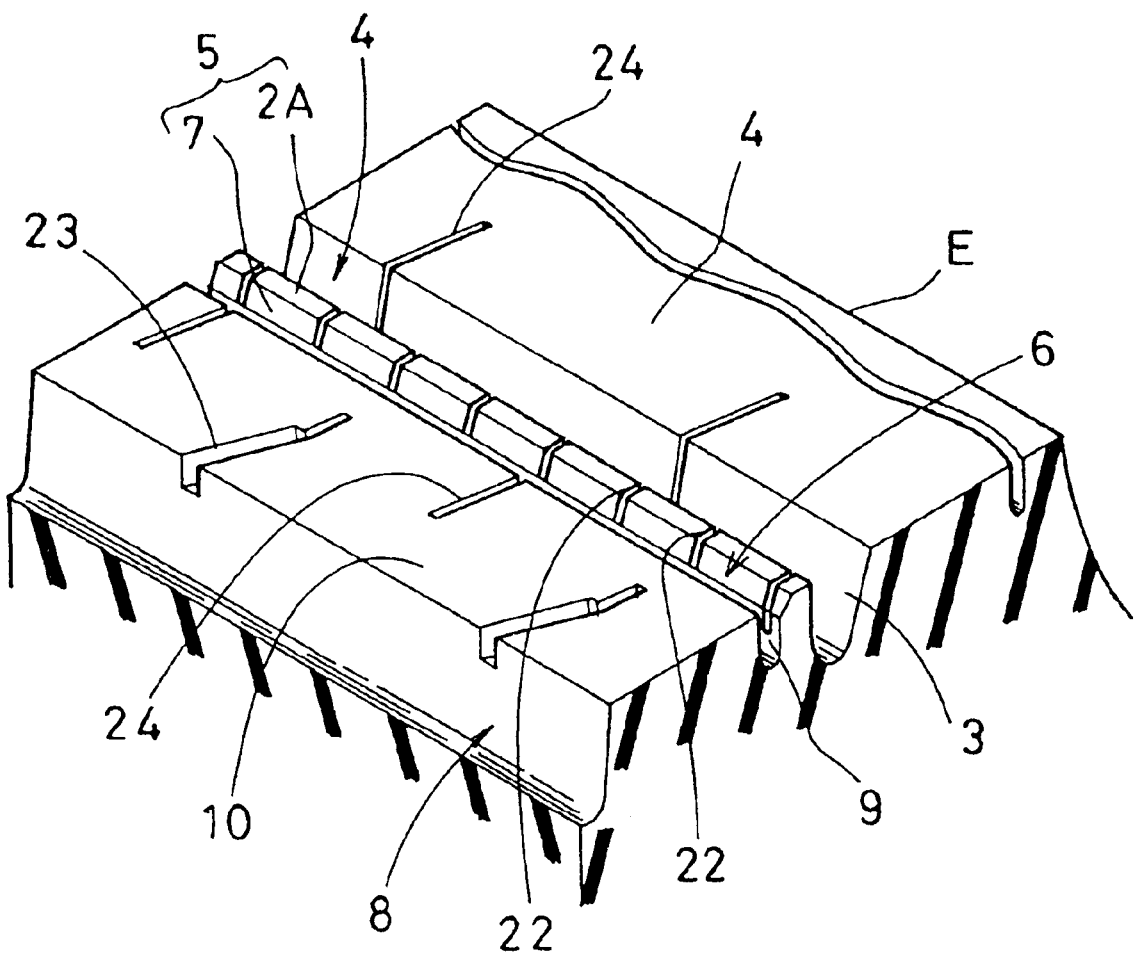
FIG. 3 is a perspective view showing the tread shoulder portion thereof.
Figure 4:
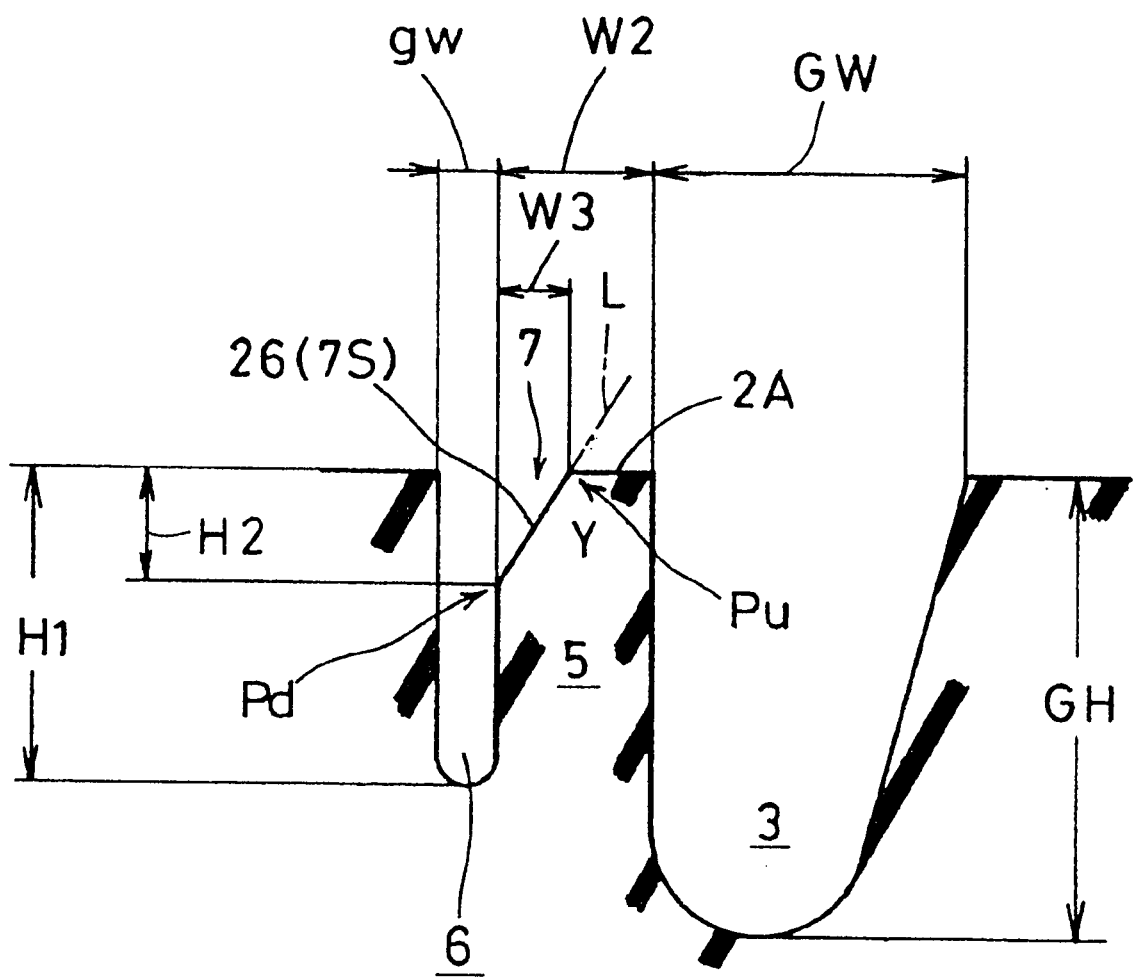
FIG. 4 is a cross sectional view of an example of the narrow rib.

In the example shown in FIGS. 3 and 4, the slope 7S is straight from the upper edge Pu to the lower edge Pd. Accordingly, the inclination angle thereof is constant.

The axial width W3 of the slope 7S (measured from the lower edge Pd to upper edge Pu) is in the range of from 0.3 to 0.8 times the narrow rib width W2.

The slope height H2 (measured radially from the tread surface 2 to the lower edge Pd) is in the range of from 0.3 to 0.8 times the groove depth H1 of the longitudinal narrow groove 6.

Figure 6:
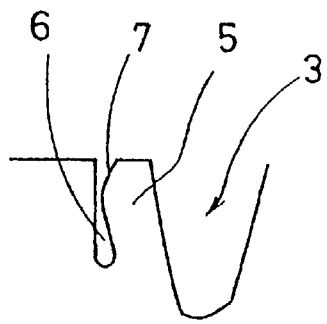
FIGS. 6(A) and (B) are schematic cross sectional views explaining the deformation of the narrow rib when subjected to a side force.
Figure 6:
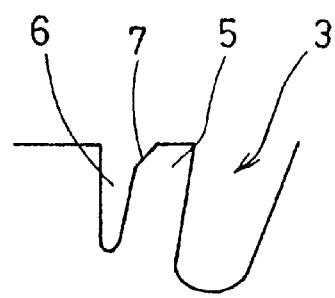

Since the narrow rib 5 is provided with the slope 7S, as shown in FIG. 6, then even if the tire is subjected to a strong side force from the road surface during cornering, the upper part of the narrow rib 5 is kept from contacting the inner rib 10. Thus, the inner rib 10 is not moved by the narrow rib 5.

If the axial width W3 is less than 0.3 times the narrow rib width W2, the inner rib 10 is liable to move together with the narrow rib 5, and the wear is liable to spread over the inner rib 10.

If the axial width W3 is more than 0.8 times the narrow rib width W2, the top width of the narrow rib 5 decreases excessively, and the upper part of the narrow rib 5 is liable to be damaged. For example, cracks, tear and the like occur. Also, uneven wear is liable to occur on the inner rib 10.

More preferably, the narrow rib width W2 is in the range of from 0.4 to 0.6 times the axial width W3 of slope 7S.

If the slope height H2 is less than 0.3 times the groove depth H1 of the longitudinal narrow groove 6, the narrow rib 5 and inner rib 10 moved together and the wear does not concentrate on the narrow rib 5 as desired.

If the slope height H2 is more than 0.8 times the groove depth H1, then the rigidity of the narrow rib 5 decreases, the lower edge portion contacts with the inner rib 10 when deformed, and wear does not concentrate on the narrow rib 5 as desired.

More preferably, the slope height H2 is in the range of from 0.4 to 0.6 times the groove depth H1.

In this example, the narrow rib 5 is provided with sipes 22 extending substantially parallel to the axial direction of the tire across the whole width of the narrow rib 5. Further, to improve the grip performance, the shoulder ribs 4, inner ribs 10, and central rib 11 are each provided with narrow axial grooves 23 and/or sipes 24, at least one end of which reaches to one of the longitudinal grooves 3, 8 and 6 to open thereto.

Figure 7:
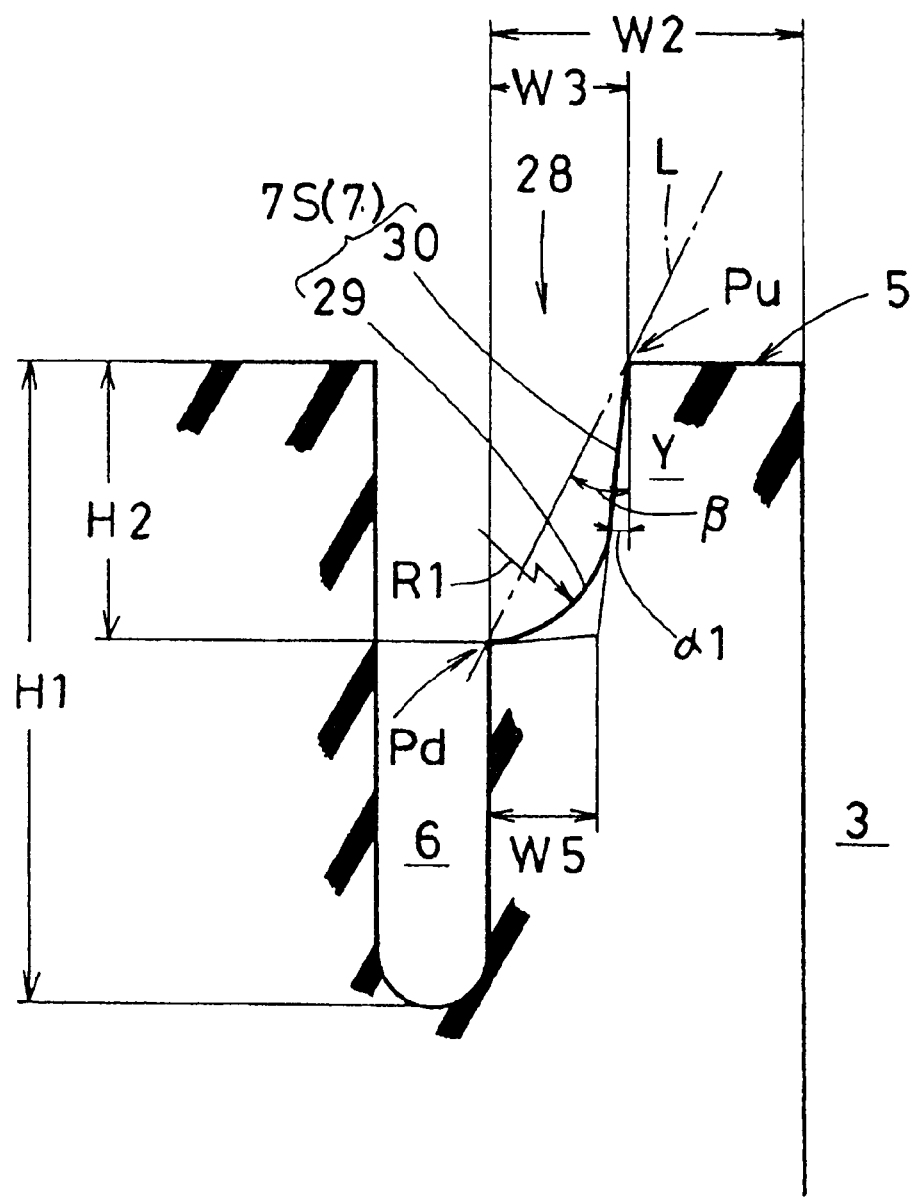
FIGS. 7, 8 and 9 are cross sectional views each showing another example of the narrow rib.
Figure 8:
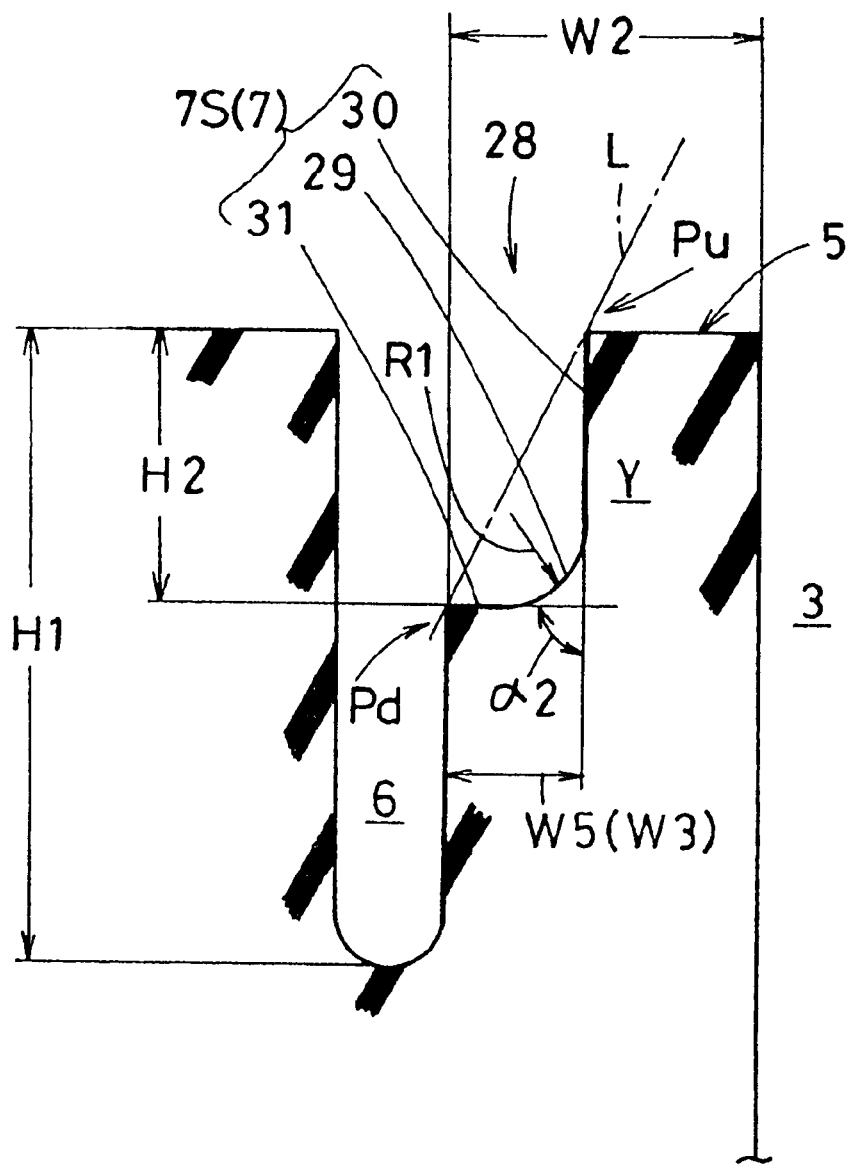
Figure 9:
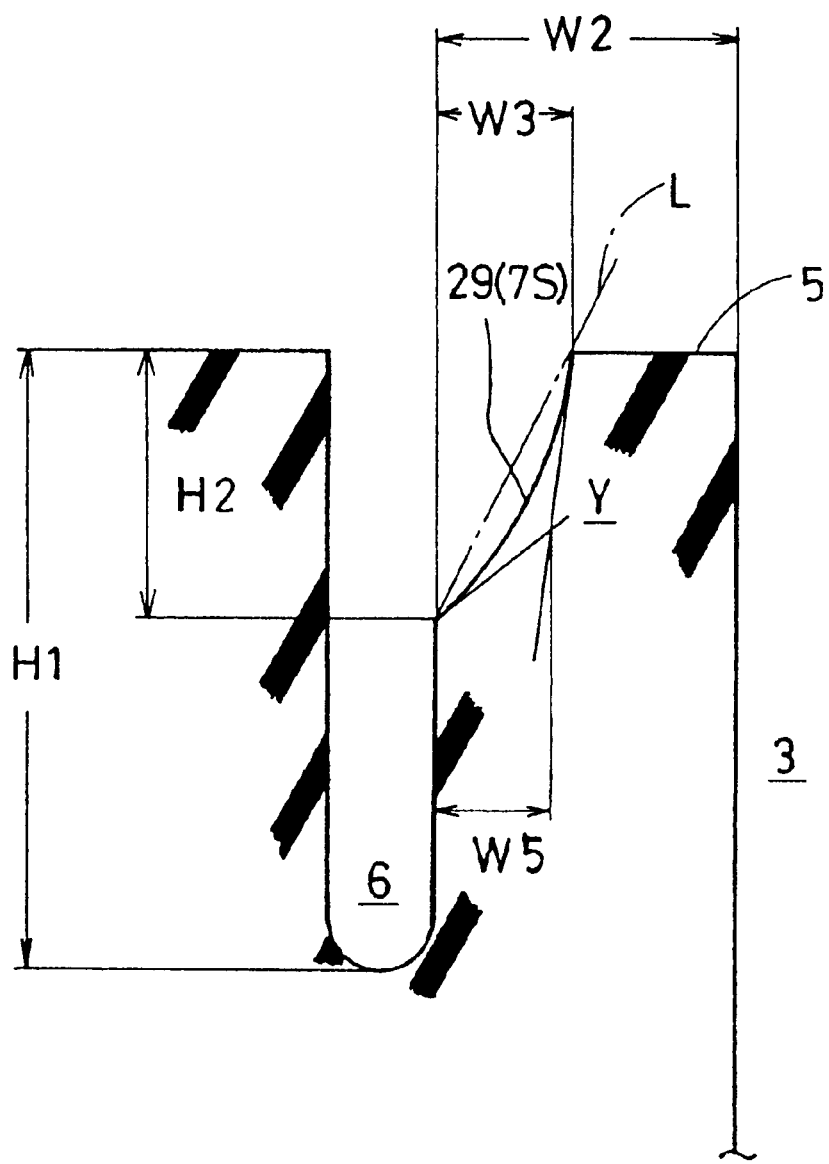
Figure 10:
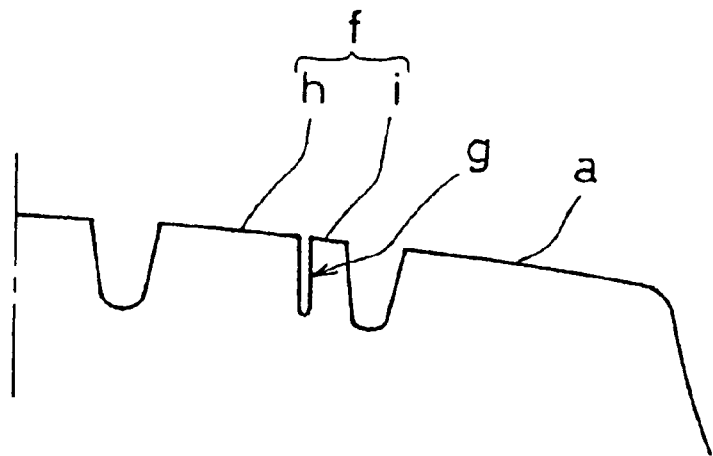
FIGS. 10(A) and (B) are cross sectional views showing the prior art.
Figure 10:
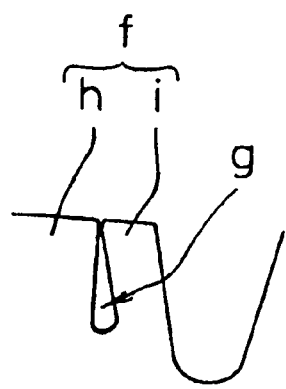

FIGS. 7, 8 and 9 show other examples of the slope 7S, wherein the slope 7S is partially or wholly curved, and the slope 7S is concave on the whole.

In FIG. 7, the slope 7S consists of a straight upper part 30 and a concave lower part 29. The upper part 30 extends straight radially inwardly from the upper edge Pu, inclining towards the longitudinal narrow groove 6 at a small angle of ($\alpha$1). The concave part 29 extends radially and axially inwardly from the radially inner end of the upper part 30 to the lower edge Pd.

In FIG. 8, the slope 7S consists of a straight upper part 30, a concave part 29, and a straight lower part 31. The upper part 30 extends straight radially inwardly from the upper edge Pu, inclining towards the longitudinal narrow groove 6 at a small angle ($\alpha$1). The concave part 29 extends radially and axially inwardly from the radially inner end of the upper part 30.

The lower part 31 extends straight axially inwardly from the radially inner end of the concave part 29 to the lower edge Pd, inclining at a large angle ($\alpha$2).

In FIG. 9, the slope 7S consists of a concave part 29. That is, the slope 7S is curved from the upper edge Pu to the lower edge Pd.

In FIGS. 7–9, the inclination angle of the slope 7S with respect to the normal to the tread decreases on the whole from the upper edge Pu to the lower edge Pd.

The inclination angle ($\alpha$1) of the upper straight part 30 is not less than 0 degree and less than the inclination angle ($\beta$) of the straight L drawn between the upper and lower edges Pu and Pd.

The inclination angle ($\alpha$2) of the lower straight part 31 is more than the inclination angle ($\beta$) and preferably substantially 90 degrees.

The axial distance W5 between the lower edge Pd and the intersection of two tangential lines Tu and Td to the slope 7S drawn at the upper and lower edges Pu and Pd is not more than the above-mentioned axial width W3 of slope 7S.

The radius of curvature R1 of the curved part 29 is not more than 1.5 times the axial width W3 of slope 7S.

By using a concave slope instead of a straight slope, rigidity is decreased less, and the space between the inner rib 10 and the narrow rib 5 can be maintained even if the narrow rib 5 deforms towards the inner rib 10. Thus the concave slope is superior for controlling of the uneven wear.

In case of the concave slope, for the same reasons as the straight slope, it is preferable that the axial width W3 of the slope is 0.3 to 0.8 times the narrow rib width W2, and that the slope height H2 is 0.3 to 0.8 times the longitudinal narrow groove depth H1. But more preferably, the slope height H2 is 0.35 to 0.60 times the depth H1, and the slope axial width W3 is 0.4 to 0.6 times the width W2.

Comparison tests

Test tires having the same internal structure and tread pattern shown in FIGS. 1 and 2 except for the narrow ribs were made and subjected to the following test. The specifications of the test tires and the test results are given in Tables 1 and 2.

Figure 5:
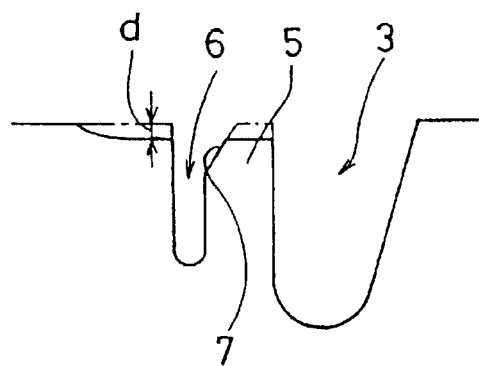
FIG. 5 is a cross sectional view explaining the wear.

The test tires were mounted on the front wheels of a trailer head (2-DD tractor) and run on dry asphalt-surfaced roads for 20000 km. Then, as shown in FIG. 5, the maximum (d) of the uneven wear in the inner rib was measured.

Tire size: 285/75R24.5
Rim size: 8.25×24.5
Inner pressure: 7.65 kgf/sq.cm
Carrying load: about 20 tons

TABLE 1

| Tire | Ex.A1 | Ex.A2 | Ex.A3 | Ex.A4 | Ex.A5 | Ex.A6 | Ex.A7 | Conv. | Ref.1 | Ref.2 | Ref.3 | Ref.4 | Ref.5 |
| --- | --- | --- | --- | --- | --- | --- | --- | --- | --- | --- | --- | --- | --- |
| Rib (FIG.) | 4 | 4 | 4 | 4 | 4 | 4 | 4 | 10 | 11(D) | 11(E) | 11(C) | 11(A) | 11(B) |
| GH (mm) | 14.6 | 14.6 | 14.6 | 14.6 | 14.6 | 14.6 | 14.6 | 14.6 | 14.6 | 14.6 | 14.6 | 14.6 | 14.6 |
| WIA (mm) | 28 | 28 | 28 | 28 | 28 | 28 | 28 | 28 | 28 | 28 | 28 | 28 | 28 |
| gw (mm) | 2 | 2 | 2 | 2 | 2 | 2 | 2 | 2 | 2 | 2 | 2 | 2 | 2 |
| W2 (mm) | 5 | 5 | 5 | 5 | 5 | 5 | 5 | 5 | 5 | 5 | 5 | 5 | 5 |
| W3 (mm) | 1.5 | 2 | 3 | 4 | 2 | 2 | 2 | — | 5 | 2 | 2 | — | — |
| W3/W2 | 0.3 | 0.4 | 0.6 | 0.8 | 0.4 | 0.4 | 0.4 | — | 1 | 0.4 | 0.4 | — | — |
| H1 (mm) | 10 | 10 | 10 | 10 | 10 | 10 | 10 | 10 | 10 | 10 | 10 | 10 | 10 |
| H2 (mm) | 4 | 4 | 4 | 4 | 3 | 6 | 8 | — | 4 | 10 | 3.5 | — | — |
| H2/H1 | 0.4 | 0.4 | 0.4 | 0.4 | 0.3 | 0.6 | 0.8 | — | 0.4 | 1 | 0.35 | — | — |
| Wear d (mm) | 1 | 0.5 | non | 1 | 1 | non | 1.7 | 3 | *3.0 | 2.5 | 3 | 3 | 3 |

*Crack at the upper edge Pu

TABLE 2

| Tire | Ex.B1 | Ex.B2 | Ex.B3 | Ex.B4 | Ex.B5 | Ex.B6 | Ex.B7 |
| --- | --- | --- | --- | --- | --- | --- | --- |
| Rib (FIG.) | 7 | 7 | 7 | 7 | 7 | 7 | 7 |
| GH (mm) | 14.6 | 14.6 | 14.6 | 14.6 | 14.6 | 14.6 | 14.6 |
| WIA (mm) | 28 | 28 | 28 | 28 | 28 | 28 | 28 |
| gw (mm) | 2 | 2 | 2 | 2 | 2 | 2 | 2 |
| W2 (mm) | 5 | 5 | 5 | 5 | 5 | 5 | 5 |
| W3 (mm) | 1 | 1.5 | 2 | 2 | 3 | 4 | 4 |
| W3/W2 | 0.2 | 0.3 | 0.4 | 0.4 | 0.6 | 0.8 | 0.8 |
| H1 (mm) | 10 | 10 | 10 | 10 | 10 | 10 | 10 |
| H2 (mm) | 6 | 1.5 | 3.5 | 6 | 3.5 | 1.5 | 3.5 |
| H2/H1 | 0.6 | 0.15 | 0.35 | 0.6 | 0.35 | 0.15 | 0.35 |
| W5 (mm) | 1 | 2 | 2 | 2 | 3 | 2 | 4 |
| R1 (mm) | 1.5 | 2.5 | 2.5 | 2.5 | 3.5 | 2.5 | 5 |
| gw/(gw + W3) | 0.67 | 0.57 | 0.5 | 0.5 | 0.4 | 0.33 | 0.33 |
| Wear d (mm) | 2 | 2 | non | non | 1 | 2.5 | 1.5 |

Figure 11:
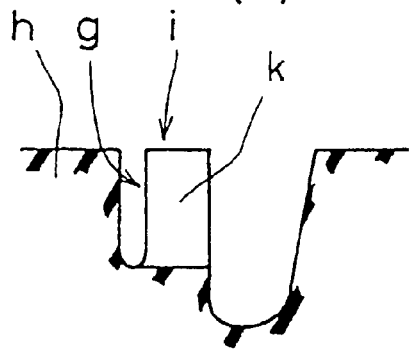
FIGS. 11(A)-11(E) show the cross section of the narrow ribs used in the comparison tests the results of which are shown in Table 1.
Figure 11:
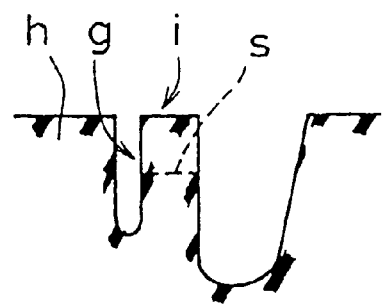
Figure 11:
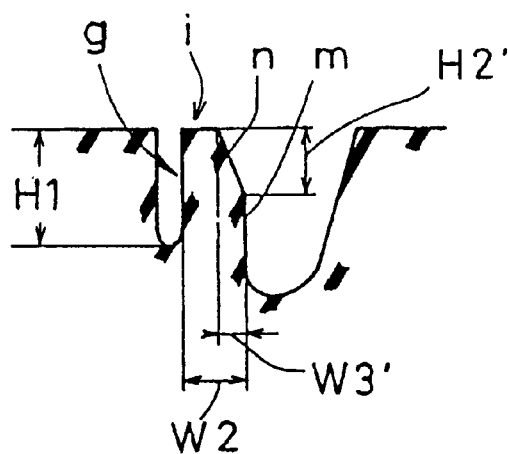
Figure 11:
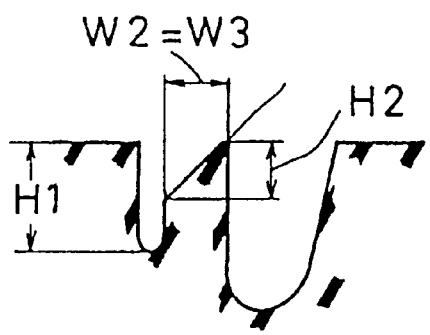
Figure 11:
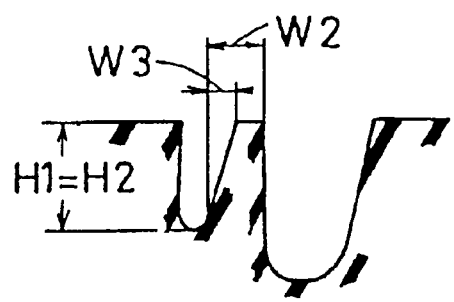

In FIG. 11(A), the narrow rib (i) is circumferentially divided by eighty slits (k) (width 5 mm, depth 9 mm).

In FIG. 11(B), the narrow rib (i) is circumferentially divided by eighty cuts (s) (depth 4.5 mm, width almost zero).

In FIG. 11(C), the axially outer edge of the narrow rib (i) chamfered along the entire circumference of the tire.

As described above, in the heavy duty pneumatic tires according to the present invention, the axially inside corner of the narrow rib is chamfered and the cross sectional shape is specifically limited. Therefore, the axially inner rib adjacent the narrow rib is effectively prevented from wearing unevenly.

Especially, in the initial stage of tread wear life, rubber tears and cracks of the narrow rib on which the wear is to be concentrated can be prevented and the prevention of the uneven wear can be further improved.

What is claimed is:

1. A pneumatic tire comprising a tread portion including an axially outer longitudinal main groove and an axially inner longitudinal narrow groove, said main and narrow grooves each extending circumferentially about the tire to define a narrow rib therebetween, said narrow rib being provided with sipes extending across width of said narrow rib, an axially inner edge of said narrow rib chamfered by a sloped portion, said sloped portion extending from a top surface of said narrow rib to the axially inner surface of the narrow rib thereby defining upper and lower edges of said sloped portion, and an axial width of said sloped portion measured between said upper and lower edges is in the range from 0.4 to 0.6 times an axial width of said narrow rib.

2. The pneumatic tire according to claim 1, where an axial width of said axially inner longitudinal narrow groove is in the range of from 0.5 to 2.5 mm.

3. The pneumatic tire according to claim 2, wherein said sloped portion extends straight from said upper edge to said lower edge.

4. The pneumatic tire according to claim 2, wherein said sloped portion comprises a concave portion.

5. The pneumatic tire according to claim 1, where an axial width of said axially inner longitudinal narrow groove is in the range of from 0.5 to 2.5 mm, and a radial height of said sloped portion measured between said upper and lower edges is in the range of from 0.3 to 0.8 times a depth of said axially inner longitudinal narrow groove.

6. The pneumatic tire according to claim 5, wherein said sloped portion extends straight from said upper edge to said lower edge.

7. The pneumatic tire according to claim 5, wherein said sloped portion comprises a concave portion.

8. The pneumatic tire according to claim 1, wherein said sloped portion extends straight from said upper edge to said lower edge.

9. The pneumatic tire according to claim 1, wherein said sloped portion comprises a concave portion.

10. The pneumatic tire according to claim 9, wherein said sloped portion consists of a radially outer straight part and a radially inner concave part.

11. The pneumatic tire according to claim 10, wherein an axial distance between said lower edge and an intersection of two tangents drawn to said sloped portion at said upper and lower edges, respectively, is not more than said axial width between said upper and lower edges, and said radially inner concave part has a single radius of curvature of not more than 1.5 times an axial width between said upper and lower edges.

12. The pneumatic tire according to claim 9, wherein sloped portion consists of a radially outer straight part, a radially inner straight part, and a concave part therebetween.

13. The pneumatic tire according to claim 12, wherein distance between said lower edge and an intersection of two tangents drawn to said sloped portion at said upper and lower edges, respectively, is not more than an axial width between said upper and lower edges, and said concave part has a single radius of curvature of not more than 1.5 times said axial width between said upper and lower edges.

14. The pneumatic tire according to claim 9, wherein said sloped portion consists of a single concave part.

15. The pneumatic tire according to claim 14, wherein an axial distance between said lower edge an d an intersection of two tangents drawn to said sloped portion at said upper and lower edges, respectively, is not more than an axial width between said upper and lower edges, and said concave part has a single radius of curvature of not more than 1.5 times said axial width between said upper and lower edges.

16. The pneumatic tire according to claim 9, wherein an axial distance between said lower edge and an intersection of two tangents drawn to said sloped portion at said upper and lower edges, respectively, is not more than an axial width between said upper and lower edges, and said concave portion has a single radius of curvature of not more than 1.5 times said axial width between said upper and lower edges.

17. A pneumatic tire comprising a tread portion including an axially outer longitudinal main groove and an axially inner longitudinal narrow groove, said main and narrow grooves each extending circumferentially about the tire to define a narrow rib therebetween, said narrow rib being provided with sipes extending across width of said narrow rib, an axially inner edge of said narrow rib chamfered by a sloped portion, said sloped portion extending from a top surface of said narrow rib to the axially inner surface of the narrow rib thereby defining upper and lower edges of said sloped portion, said sloped portion is concave between said upper and lower edges, an axial width of said sloped portion measured between said upper and lower edges is in the range from 0.4 to 0.6 times an axial width of said narrow rib, and a radial height of said sloped portion measured between said upper and lower edges is in the range from 0.3 to 0.8 times a depth of said axially inner longitudinal narrow groove.

* * * * *